(12) United States Patent
Du et al.

(10) Patent No.: US 12,284,584 B2
(45) Date of Patent: Apr. 22, 2025

(54) CONVERGENCE OF PUBLIC WARNING SYSTEM (PWS) AND MULTIMEDIA SERVICE FOR EMERGENCY BROADCAST

(71) Applicant: QUALCOMM Incorporated, San Diego, CA (US)

(72) Inventors: Zhimin Du, Beijing (CN); Yiqing Cao, Beijing (CN); Yan Li, Beijing (CN); Thomas Stockhammer, Bergen (DE); Lenaig Genevieve Chaponniere, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 305 days.

(21) Appl. No.: 17/904,886

(22) PCT Filed: Mar. 24, 2020

(86) PCT No.: PCT/CN2020/080837
§ 371 (c)(1),
(2) Date: Aug. 24, 2022

(87) PCT Pub. No.: WO2021/189236
PCT Pub. Date: Sep. 30, 2021

(65) Prior Publication Data
US 2023/0116112 A1 Apr. 13, 2023

(51) Int. Cl.
*H04W 48/08* (2009.01)
*H04H 20/59* (2008.01)
(Continued)

(52) U.S. Cl.
CPC .............. *H04W 4/90* (2018.02); *H04H 20/59* (2013.01); *H04N 21/482* (2013.01);
(Continued)

(58) Field of Classification Search
CPC ......... H04W 4/90; H04W 4/06; H04W 48/08; H04W 72/232; H04H 20/59; H04N 21/482; H04N 21/814
See application file for complete search history.

(56) References Cited

U.S. PATENT DOCUMENTS

2007/0021099 A1\* 1/2007 Sato ................... H04H 20/57
455/411
2009/0100457 A1\* 4/2009 Lee .................... H04N 21/6581
725/28

(Continued)

FOREIGN PATENT DOCUMENTS

CN 101959134 A 1/2011

OTHER PUBLICATIONS

Supplementary European Search Report—EP20927584—Search Authority—Munich—Nov. 21, 2023.
(Continued)

*Primary Examiner* — Fahmida S Chowdhury
(74) *Attorney, Agent, or Firm* — Kevin M. Donnelly; Patterson & Sheridan LLP

(57) ABSTRACT

Certain aspects of the subject matter described in this disclosure can be implemented in a method for wireless communication by a user equipment (UE). The method generally includes receiving a public warning system (PWS) message, wherein the PWS message includes information associated with at least one program provided via a multimedia service, and retrieving the at least one program via the multimedia service based on the information indicated in the PWS message.

34 Claims, 9 Drawing Sheets

500

Receive a public warning system (PWS) message, wherein the PWS message includes information associated with at least one program provided via a multimedia service — 505

Retrieve the at least one program via the multimedia service based on the information indicated in the PWS message. — 510

(51) Int. Cl.
  *H04N 21/482* (2011.01)
  *H04N 21/81* (2011.01)
  *H04W 4/06* (2009.01)
  *H04W 4/90* (2018.01)
  *H04W 72/232* (2023.01)
(52) U.S. Cl.
  CPC ............ *H04N 21/814* (2013.01); *H04W 4/06* (2013.01); *H04W 48/08* (2013.01); *H04W 72/232* (2023.01)

(56) References Cited

U.S. PATENT DOCUMENTS

| | | | | |
|---|---|---|---|---|
| 2009/0130972 | A1* | 5/2009 | Andersen | H04W 8/245 455/3.01 |
| 2012/0295536 | A1* | 11/2012 | Klatt | H04W 76/40 455/3.01 |
| 2014/0134970 | A1* | 5/2014 | Pazos | H04W 4/90 455/404.1 |
| 2014/0273909 | A1* | 9/2014 | Ballantyne | H04W 4/90 455/404.1 |
| 2014/0273910 | A1* | 9/2014 | Ballantyne | H04W 4/90 455/404.1 |
| 2015/0381448 | A1* | 12/2015 | Cheng | H04L 12/189 370/252 |
| 2016/0007316 | A1* | 1/2016 | Vaidya | H04W 64/003 370/312 |
| 2017/0013433 | A1* | 1/2017 | Lee | H04W 4/06 |
| 2017/0086047 | A1 | 3/2017 | Buckley et al. | |
| 2017/0086055 | A1* | 3/2017 | Klatt | H04W 8/005 |
| 2019/0110182 | A1* | 4/2019 | Liu | H04W 4/06 |
| 2019/0200208 | A1* | 6/2019 | Chandramouli | H04W 80/10 |
| 2020/0021993 | A1* | 1/2020 | Yang | H04L 63/123 |
| 2021/0018630 | A1* | 1/2021 | Mueller | H04L 67/56 |
| 2021/0235252 | A1* | 7/2021 | Shikari | H04W 76/28 |
| 2021/0243067 | A1* | 8/2021 | Ping | H04L 41/0895 |
| 2021/0258755 | A1* | 8/2021 | Schmidt | H04L 63/164 |

OTHER PUBLICATIONS

International Search Report and Written Opinion—PCT/CN2020/080837—ISA/EPO—Dec. 23, 2020.

NTT Docomo: "ETWS with E-MBMs (Alternative 2—Primary Notification in Session Start)," TD S2-080396, 3GPP TSG SA WG2 Meeting #62, Jan. 14-18, 2008 (Jan. 18, 2008), 3 pages, sections 1, 5.

* cited by examiner

CONVERGENCE OF PUBLIC WARNING SYSTEM (PWS) AND MULTIMEDIA SERVICE FOR EMERGENCY BROADCAST

CROSS-REFERENCE TO RELATED APPLICATIONS

This application is a national stage application under 35 U.S.C. 371 of PCT/CN2020/080837, filed Mar. 24, 2020, which is hereby expressly incorporated by reference herein in its entirety as if fully set forth below and for all applicable purposes.

BACKGROUND

Field of the Disclosure

Aspects of the present disclosure relate generally to wireless communications, and more particularly, to techniques for enhanced communication of public warning messages and emergency broadcasts.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (for example, bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (for example, 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

Many countries have implemented a public warning system (PWS) that can be used to alert and inform citizens of an expected emergency scenario. For example, North America (NA), Europe (EU), Japan, and South Korea (SK) have implemented public warning messages in emergency situations. The PWS may be used to send messages to mobile devices using any suitable radio access technology such as LTE or NR. In some examples, the PWS may be implemented using a cell broadcast system (CBS).

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved public warning system.

Certain aspects of the subject matter described in this disclosure can be implemented in a method for wireless communication by a user equipment (UE). The method generally includes receiving a public warning system (PWS) message, wherein the PWS message includes information associated with at least one program provided via a multimedia service, and retrieving the at least one program via the multimedia service based on the information indicated in the PWS message.

Certain aspects of the subject matter described in this disclosure can be implemented in a method for wireless communication. The method generally includes generating a public warning system (PWS) message, wherein the PWS message includes information associated with at least one program provided via a multimedia service, and transmitting the PWS message to a user-equipment (UE).

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail some illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only some typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
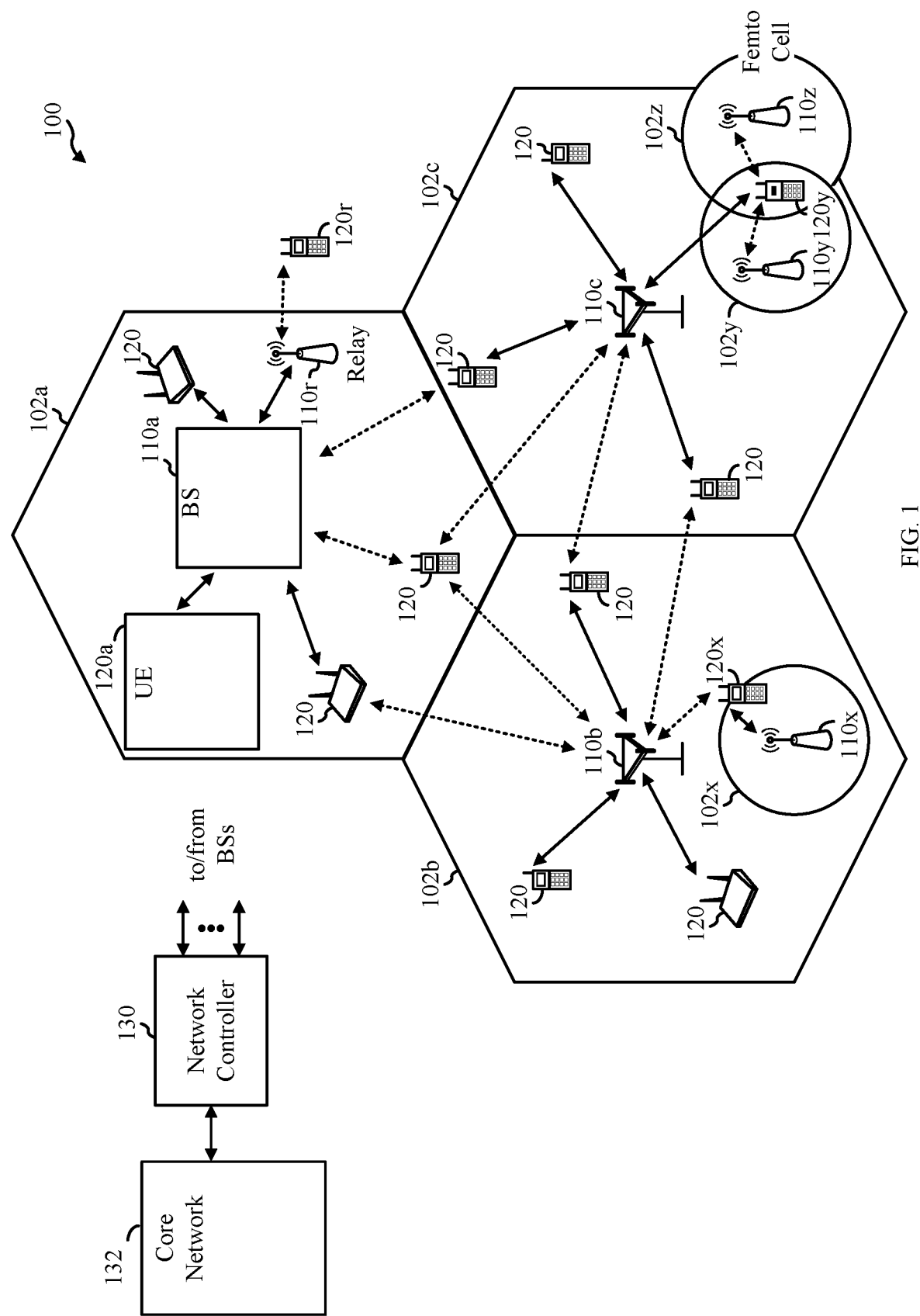
FIG. 1 illustrates an example wireless communication network in which aspects of the present disclosure may be performed.

Various aspects relate generally to a UE receiving a message via a public warning system (PWS) that facilitates reception of multimedia content using one or more of various suitable radio access technologies. Some implementations more specifically relate to a UE receiving a PWS message that includes information to be used for retrieval of emergency broadcast programming. The emergency broadcast programming may be retrieved using a multimedia service, such as enhanced multimedia broadcast and multicast system (eMBMS) or enhanced television (EnTV). In some implementations, the information may include a web address that a user may use to retrieve the programming. In other cases, the information may include service announcement information that may be used by a UE or the user to retrieve the programming. For instance, the service announcement information may be used by the UE to automatically retrieve and display the programming without user input. In some cases, the PWS message may indicate to the UE that the service announcement information is to be received via another message, such as a radio resource control (RRC) message or data on a downlink shared channel. The UE may then receive the other message, decode the service announcement information, and retrieve the emergency broadcast programming accordingly.

Particular implementations of the subject matter described in this disclosure can be implemented to realize one or more of the following potential advantages. In some implementations, the described techniques can be used to provide multimedia content to a user that may be used for self-rescue or otherwise to prepare or respond to an emergency scenario. Conventionally, because a PWS message may be limited in the amount of content it can deliver to a user, a user may not have access to critical information needed to prepare for or respond to such an emergency scenario. For example, while a PWS message may notify a user of an emergency scenario, the PWS message may not be able to deliver the amount of information needed for rescue efforts. Advantageously, the described techniques enable augmentation of the content in the PWS message. For example, by including information in the PWS message that allows for the retrieval of emergency broadcast programming, a user can obtain important programming using a multimedia service to facilitate rescue efforts.

The following description provides examples of communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (for example, 5G NR) wireless technologies, aspects of the present disclosure can be applied in other generation-based communication systems.

NR access may support various wireless communication services, such as enhanced mobile broadband (eMBB) targeting wide bandwidth (for example, 80 MHz or beyond), millimeter wave (mmW) targeting high carrier frequency (for example, 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (for example, a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110*a-z* (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (for example, a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (for example, via a backhaul).

The BSs 110 communicate with UEs 120a-y (each also individually referred to herein as UE 120 or collectively as UEs 120) in the wireless communication network 100. The UEs 120 (for example, 120x, 120y, etc.) may be dispersed throughout the wireless communication network 100, and each UE 120 may be stationary or mobile. Wireless communication network 100 may also include relay stations (for example, relay station 110r), also referred to as relays or the like, that receive a transmission of data and/or other information from an upstream station (for example, a BS 110a or a UE 120r) and sends a transmission of the data and/or other information to a downstream station (for example, a UE 120 or a BS 110), or that relays transmissions between UEs 120, to facilitate communication between devices.

Figure 2:
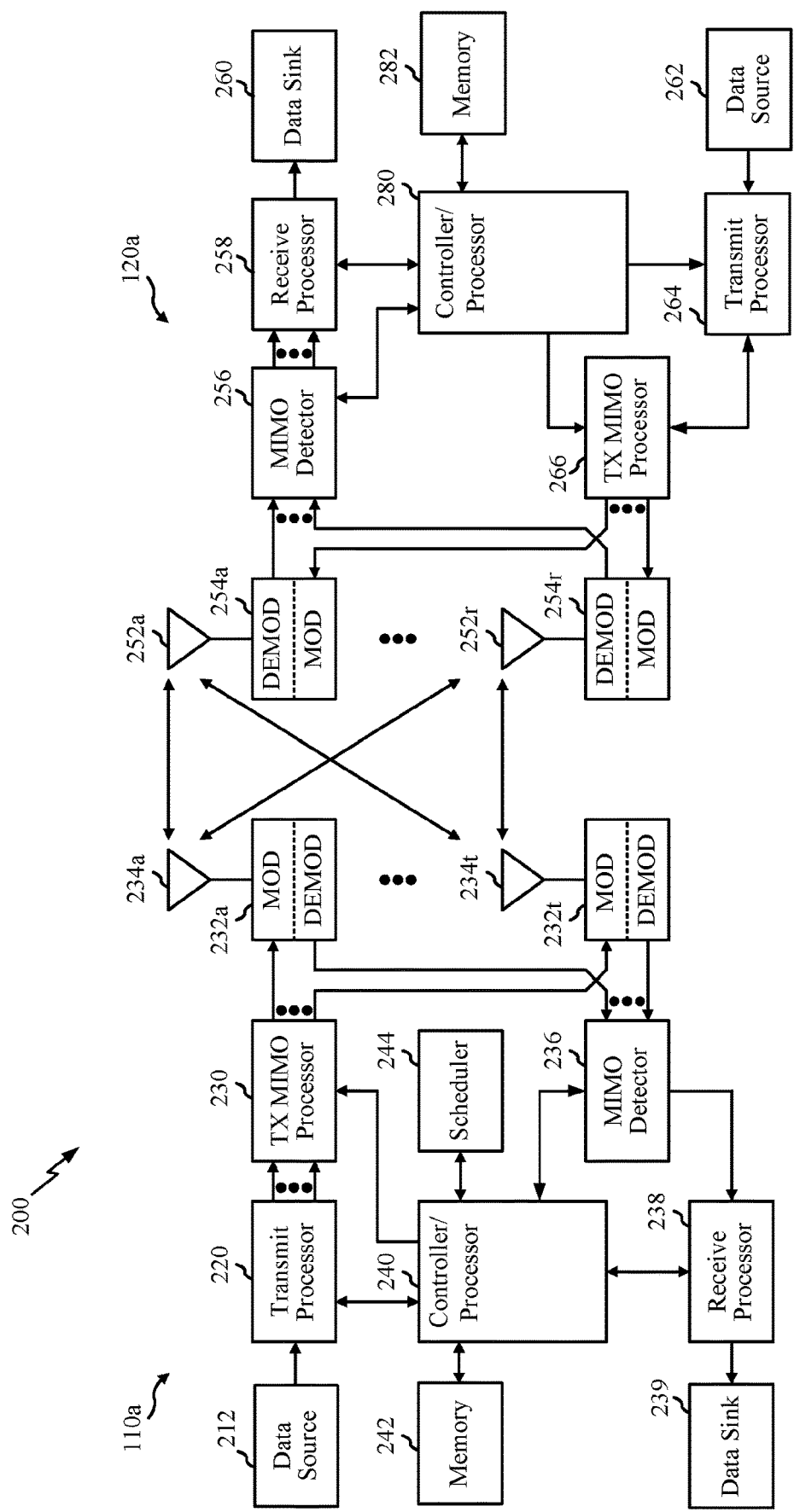
FIG. 2 illustrates example components of a base station (BS) and user-equipment (UE), which may be used to implement aspects of the present disclosure.

FIG. 2 illustrates example components of BS 110a and UE 120a (for example, in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (for example, encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (for example, precoding) on the data symbols, the control symbols, and/or the reference symbols, if applicable, and may provide output symbol streams to the modulators (MODs) 232a-232t. Each modulator 232 may process a respective output symbol stream (for example, for OFDM, etc.) to obtain an output sample stream. Each modulator may further process (for example, convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (for example, filter, amplify, downconvert, and digitize) a respective received signal to obtain input samples. Each demodulator may further process the input samples (for example, for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (for example, demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (for example, for the physical uplink shared channel (PUSCH)) from a data source 262 and control information (for example, for the physical uplink control channel (PUCCH)) from the controller/processor 280. The transmit processor 264 may also generate reference symbols for a reference signal (for example, for the sounding reference signal (SRS)). The symbols from the transmit processor 264 may be precoded by a TX MIMO processor 266 if applicable, further processed by the modulators in transceivers 254a-254r (for example, for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (for example, 30 kHz, 60 kHz, 120 kHz, 240 kHz, etc.).

Figure 3:
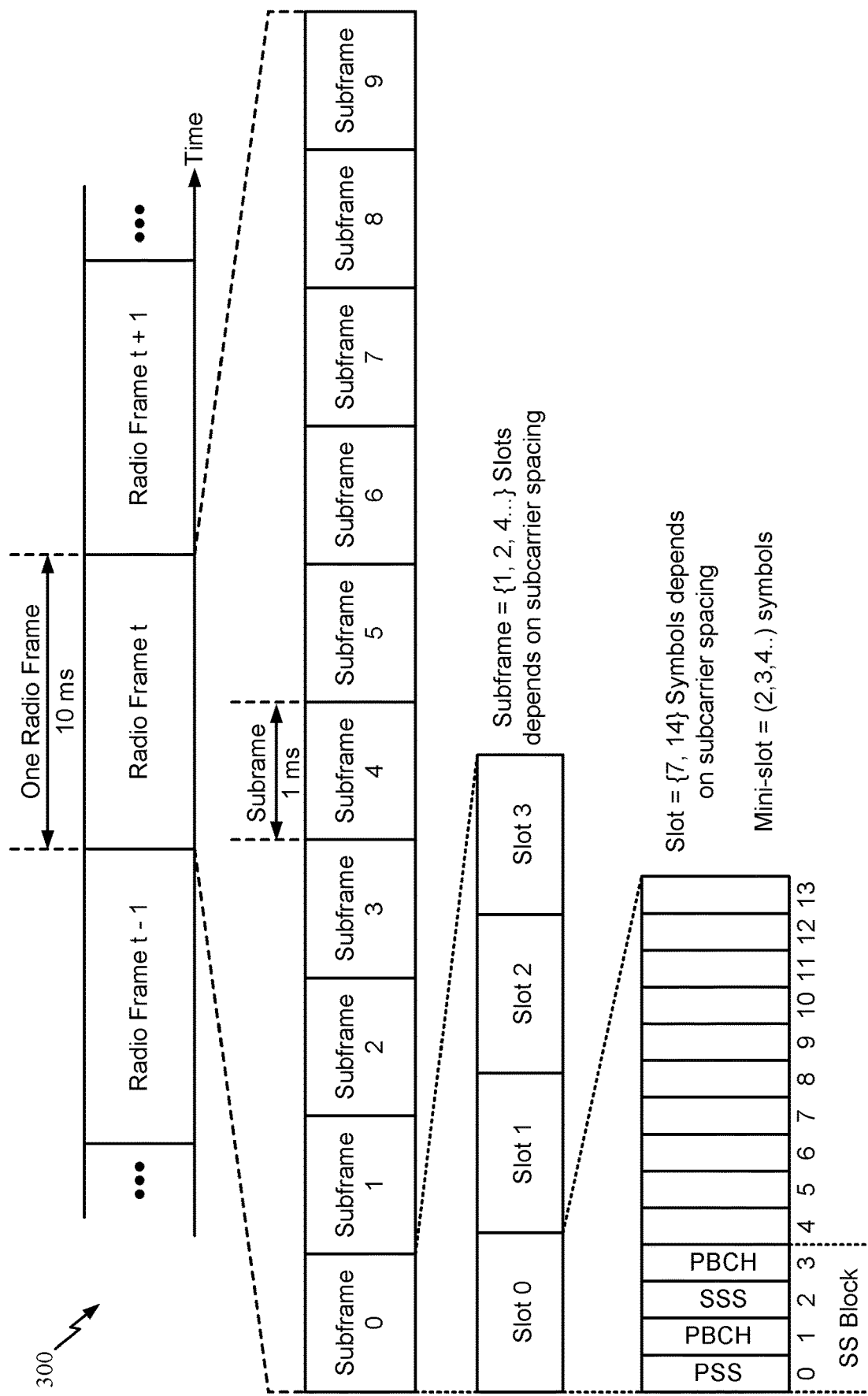
FIG. 3 is a diagram showing an example of a frame format for new radio (NR).

FIG. 3 is a diagram showing an example of a frame format 300 for NR. The transmission timeline for each of the downlink and uplink may be partitioned into units of radio frames. Each radio frame may have a predetermined duration (for example, 10 ms) and may be partitioned into 10 subframes, each of 1 ms, with indices of 0 through 9. Each subframe may include a variable number of slots (for example, 1, 2, 4, 8, 16, . . . slots) depending on the SCS. Each slot may include a variable number of symbol periods (for example, 7 or 14 symbols) depending on the SCS. The symbol periods in each slot may be assigned indices. A mini-slot, which may be referred to as a sub-slot structure, refers to a transmit time interval having a duration less than a slot (for example, 2, 3, or 4 symbols). Each symbol in a slot may indicate a link direction (for example, DL, UL, or flexible) for data transmission and the link direction for each subframe may be dynamically switched. The link directions may be based on the slot format. Each slot may include DL/UL data as well as DL/UL control information.

Example Public Warning System

A public warning system (PWS) is an architecture deployed in various regions such as North America (NA), Europe (EU), Japan, and South Korea (SK) for providing public warning messages in emergency situations based on cell broadcast technology. The PWS may be in accordance with regional regulatory requirements and mandates such as the EU-ALERT, NA's Commercial Mobile Alert System (CMAS), Japan's Earthquake & Tsunami Warning System (ETWS) and South Korea's Korean Public Alert System (KPAS). The deployments and trials may be based on 3GPP PWS specifications. The PWS may use a cell broadcast service (CBS)-based transport. A PWS message may be a text-only warning message. In some implementations, such as release-16 (R16) of the 3GPP standard, an enhanced PWS (ePWS) may be implemented using a language-independent Unicode Symbol. PWS provides a prompt and efficient alert system and light-weight protocol. Moreover, all user-equipments (UEs) under coverage of the CBS automatically receive and parse PWS messages, and alert the users accordingly. However, the PWS may only be capable of text information, and has limited content capability. This may be sufficient for warning the public of an emergency, but not for information that may be needed for rescue operations or otherwise to prepare for or respond to an emergency. Some aspects of the present disclosure provide techniques for providing additional information to a user that may be used during an emergency scenario.

As described, PWS is based on CBS. CBS can be provided over any generation of wireless communication networks. For example, EU-Alert and CMAS may use Universal Mobile Telecommunications Service (UMTS) to provide a special warning message on a cell broadcast channel. LTE may also be used for communicating a PWS message via a system information block (SIB) (for example, SIB12). Fifth generation (5G) systems may use SIB8 for PWS message communication.

ETWS may use Global System for Mobile Communications (GSM)/UMTS. For example, a ETWS primary notification message may be sent through ETWS paging with a paging-ETWS-indicator. The ETWS may alert the user immediately as indicated by a warning type value and the UE may read the cell broadcast channel in order to acquire a possible broadcasted CBS message containing a secondary notification message.

In LTE, SIB10 may be used for a ETWS primary notification message, and SIB11 may be used for a ETWS secondary notification message. As described, a 5G system may use SIB6 for a ETWS primary notification message, and SIB7 for a ETWS secondary notification message.

EU-Alert may be implemented with a presidential alert system (e.g., a CMAS/Level 1 alert system). KPAS may use the same delivery mechanisms as EU-Alert and CMAS, and may have a class 0 alert system compatible with the presidential alert. In China, a PWS may be specified by the China Communications Standards Association (CCSA). The CBS-based China PWS solution may be fully compatible with EU-Alert/NA CMAS.

In some aspects of the present disclosure, a PWS may be used to enable delivery of multimedia content to a user. 3GPP has added features to enable mobile networks to deliver television services in new and improved ways. Television and content providers may directly provide their services over standardized interfaces. LTE will allow improved support for television services to both mobile devices and stationary TV sets over an enhanced multimedia broadcast and multicast system (eMBMS). Moreover, the feature known as enhanced television (EnTV) aims to allow wide-scale TV distribution, enhancing the existing capabilities of eMBMS.

eMBMS/EnTV can efficiently broadcast multimedia content to a virtually unlimited number of users. Signaling for eMBMS/EnTV may be carried on a dedicated radio-frequency (RF) channel, or a shared RF channel through time division multiplexing (TDM) with unicast traffic. The signaling for eMBMS/EnTV may be transported on a multicast channel (MCH). There may be various service delivery types such as streaming where content is streamed to a UE or file download where the content is downloaded by the UE as a file. The use of a multicast-broadcast single-frequency network (MBSFN), as well as integration of high-tower high power LTE broadcasts into mobile networks may improve the coverage or data rates for eMBMS/EnTV. eMBMS/EnTV provides high efficiency and high flexibility, as well as multimedia rich content. However, eMBMS/EnTV is a heavier protocol. Moreover, a UE may not automatically receive eMBMS/EnTV contents. In other words, a user or UE may first need to perform service discovery and then select or switch among different programs available via eMBMS/EnTV.

The china broadcast network (CBN), the fourth 5G operator in China, has strong interests to provide emergency broadcasting services. Such an emergency broadcasting service may be used for disasters and epidemic broadcast, to provide timely warning and supplemental rescue guidance. Some aspects of the present disclosure are directed to techniques for combining the capabilities of PWS and eMBMS/EnTV. For example, some aspects are directed to the association and synergizing of PWS and eMBMS/EnTV. In some aspects, PWS may be used to provide an instant and concise alert, followed by the use of an eMBMS/EnTV service to provide richer and multimedia-based information to supplement the PWS alert and guide rescue efforts or otherwise prepare and response to the emergency. For example, the PWS may carry service announcement information, which helps a user or UE to perform service discovery for an emergency broadcast program over eMBMS/EnTV.

Figure 4:
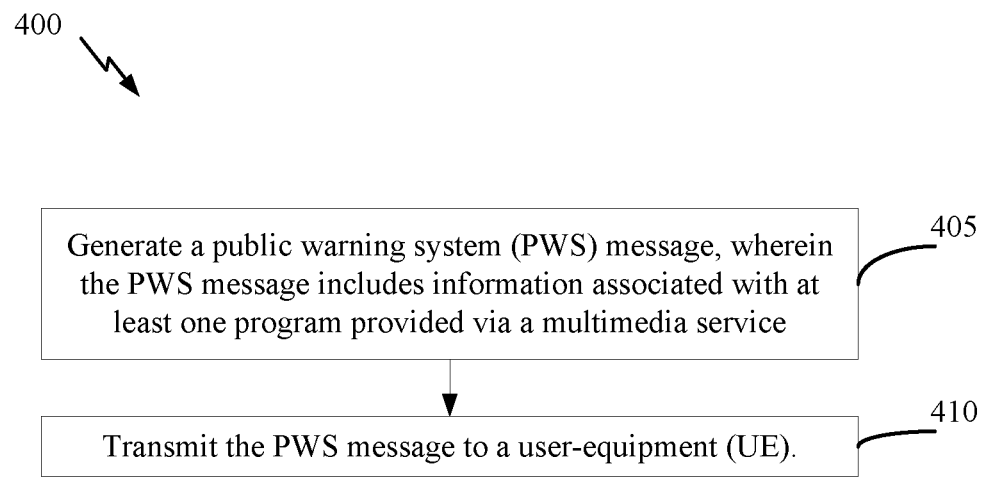
FIG. 4 is a flow diagram illustrating example operations for wireless communication by a BS, in accordance with some aspects of the present disclosure.

FIG. 4 is a flow diagram illustrating an example process 400 for wireless communication, in accordance with some aspects of the present disclosure. The process 400 may be performed, for example, by a BS (for example, such as the BS 110a in the wireless communication network 100).

Process 400 may be implemented as software components that are stored in memory and executed on one or more processors (for example, controller/processor 240 of FIG. 2) to perform the actions or operations of the process 400.

Further, the transmission and reception of signals by the BS in process 400 may be enabled, for example, by one or more antennas (for example, antennas 234 of FIG. 2). In some aspects, the transmission and/or reception of signals by the BS may be implemented via a bus interface of one or more processors (for example, controller/processor 240) obtaining and/or outputting signals.

The process 400 may begin, in block 405, by the BS generating a PWS message. The PWS message may include information associated with at least one program provided via a multimedia service. The multimedia service may include an eMBMS service or an enTV service, as described herein. In some aspects, the information may be a Uniform Resource Locator (URL) associated with the at least one program. In some aspects, the information associated with the at least one program may be any indicator signaling to the UE an existence of the at least one program. In some aspects, the information may be service announcement information for the UE to discover and retrieve the at least one program via the multimedia service. In block 410, the BS may transmit the PWS message to a UE.

In some aspects, the PWS message may indicate that service announcement information is to be received via another message. The other message may be a system information block (SIB), radio resource control (RRC) message, physical downlink shared channel (PDSCH), or any combination thereof. In this case, the process 400 may also include transmitting the other message having the service announcement information.

Figure 5:
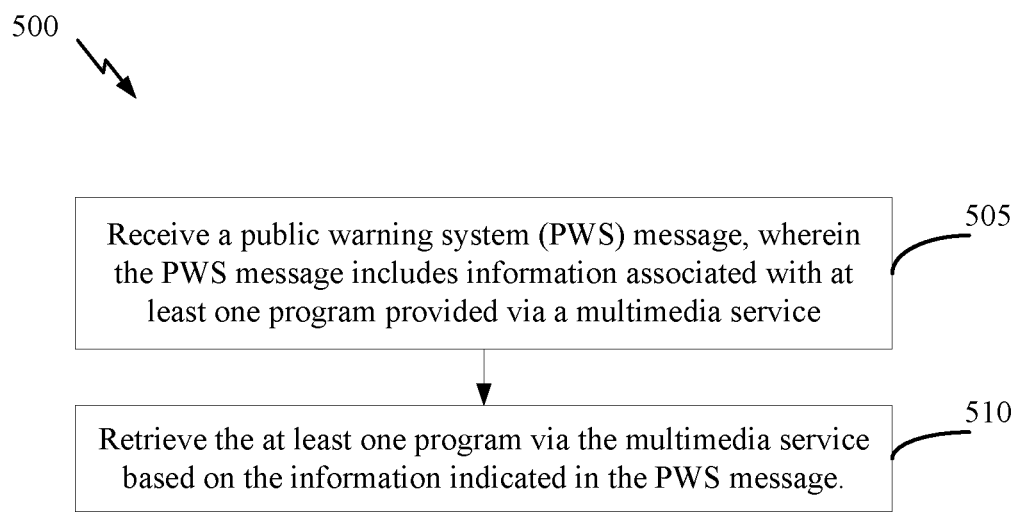
FIG. 5 is a flow diagram illustrating example operations for wireless communication by a UE, in accordance with some aspects of the present disclosure.

FIG. 5 is a flow diagram illustrating and example process 500 for wireless communication, in accordance with some aspects of the present disclosure. The process 500 may be performed, for example, by a UE (for example, such as a UE 120*a* in the wireless communication network 100). The process 500 may be a complimentary process by the UE to the process 400 performed by the BS.

Process 500 may be implemented as software components that are stored in a memory and executed on one or more processors (for example, controller/processor 280 of FIG. 2). Further, the transmission and reception of signals by the UE in process 500 may be enabled, for example, by one or more antennas (for example, antennas 252 of FIG. 2). In some aspects, the transmission and/or reception of signals by the UE may be implemented via a bus interface of one or more processors (for example, controller/processor 280) obtaining and/or outputting signals.

The process 500 may begin, in block 505, by the UE receiving a PWS message, the PWS message including information associated with at least one program provided via a multimedia service (for example, an eMBMS service or an EnTV service). In some aspects, the information may be a Uniform Resource Locator (URL) associated with the at least one program. In some aspects, the information associated with the at least one program may be any indicator signaling to the UE an existence of the at least one program. In some aspects, the information may be service announcement information for the UE to discover and retrieve the at least one program via the multimedia service. In block 510, the UE may retrieve the at least one program via the multimedia service based on the information indicated in the PWS message. For example, the process 500 may also include receiving input from a user of the UE to retrieve the at least one program, where the retrieving in block 510 is based on the input from the user.

In some aspects, the PWS message may indicate that service announcement information is to be received via another message. As described herein, the other message may be a SIB, RRC message, PDSCH, or any combination thereof. The process 500 may also include receiving the other message having the service announcement information. In this case, the program may be retrieved based on the service announcement information in the other message.

Figure 6:
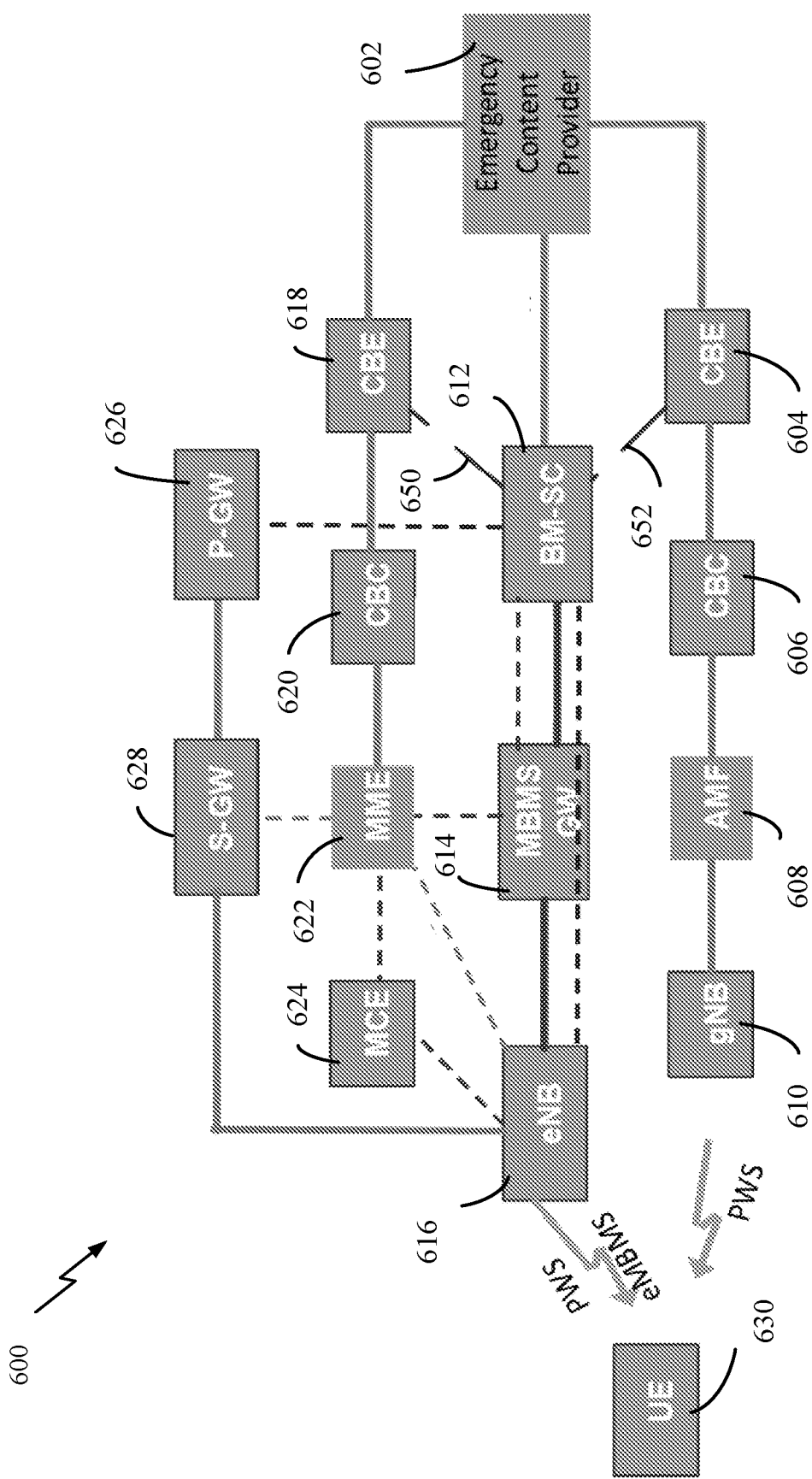
FIG. 6 illustrates an example architecture for providing multimedia service, as well as a public warning message, in accordance with some aspects of the present disclosure

FIG. 6 illustrates an architecture 600 for providing multimedia service, as well as a PWS message, in accordance with some aspects of the present disclosure. As illustrated, an emergency content provider 602 may be used to provide a PWS to a UE 630 via a cell broadcast entity (CBE) 618, cell broadcast center (CBC) 620, mobility management entity (MME) 622, and BS (for example, eNB 616). In some implementations, 5G systems may be used to provide the PWS message to UE 630. For example, CBE 604, CBC 606, access and mobility function (AMF) 608, a BS (for example, gNB 610) may be used to provide the PWS to UE 630, as illustrated. Moreover, broadcast multicast service center (BM-SC) 612, MBMS gateway (MBMS GW) 614, as well as multicast coordination entity (MCE) 624 may be used to provide multimedia service (for example, eMBMS service) to UE 630. As illustrated, the eNB 616 may be associated with a serving GW 628, as well as a packet data network gateway (P-GW) 626.

In some aspects of the present disclosure, an interface 650 may exist between BM-SC 612 and the CBE 618. Additionally or alternatively, an interface 652 may exist between BM-SC 612 and the CBE 604. The BM-SC 612 may provide emergency programming information to the CBE 618 or CBE 604 to be included as part of a PWS message to the UE 630. For example, the BM-SC 612 may indicate a web address or session information (or both) associated with programming to be provided via eMBMS to the CBE 618 or CBE 604. The eNB 616 may include the web address or session information (or both) in the PWS message transmitted to the UE 630.

In some aspects, the BS may include in the PWS message additional and text-based information to notify users of the existence of emergency broadcast program(s) over eMBMS/EnTV. This information may include a Uniform Resource Locator (URL) (for example, a web address), as described herein. The UE may then retrieve relevant service announcement information for a user of the UE for the emergency broadcast program based on the information in the PWS message. In some cases, the UE may activate an eMBMS/EnTV Application Client upon the user's input (for example, a click, tap, gesture or other selection by the user). For example, a user may use information in the PWS to turn on an eMBMS/EnTV Application Client to select and receive the emergency broadcast program.

In some aspects, the information (for example, additional and text-based information) in the PWS message may be or include a special indicator that is introduced into the PWS message to notify the UE of the existence of emergency broadcast program(s) over eMBMS/EnTV. For example, the BS may include the special indicator in one or more information elements (IEs) of the PWS message. For instance, the BS may include a new and optional IE in LTE SIB12, 5G SIB8 (for NA/EU/China/SK), or LTE SIB10/11 and 5G SIB6/7 (for Japan).

In some aspects, the information included in the PWS message may be or include a special message identifier. In some examples, various message identifiers may be preconfigured and used to communicate different information to the UE via the PWS message. In such examples, a special message identifier may be configured to indicate the existence of the emergency broadcast program(s) over eMBMS/EnTV. In some other examples, the BS may include a special Unicode Symbol in the content of the PWS message (for example, per release-16 (R16) ePWS feature).

Using a special indicator to notify a UE of the existence of emergency broadcast program(s) over eMBMS/EnTV may have some implications for the UE. For example, a UE may be configured to detect such an indicator. The UE may then prompt the user to activate the eMBMS/EnTV Application client or automatically activate eMBMS/EnTV Application Client on behalf of the user per the user's default setting.

In some aspects of the present disclosure, the information included in the PWS message may be or include service announcement information. For example, the BE may include the service announcement information in the PWS message to assist a UE in automatically discovering and receiving the corresponding emergency broadcast program(s) over eMBMS/EnTV. In some aspects, the BS may include one or more new IEs in the PWS message for indicating the service announcement information. The one or more IEs may be in LTE SIB12, 5G SIB8 (for NA/EU/China/SK), or in LTE SIB10/11 and 5G SIB6/7 (for Japan).

In some aspects, the service announcement information may carry a Temporary Mobile Group Identity (TMGI). The TMGI may indicate resources for the retrieval of the emergency broadcast program. In some cases, to reduce overhead in the PWS message, the BS may include only a portion of the TMGI (for example, an eMBMS Service ID). In some cases, the BS may include other session information for the emergency broadcast program in the PWS message that may be used for the retrieval of the emergency broadcast program.

In some aspects, a special PWS message may include the service announcement information defined to realize service announcement for the emergency broadcast program. For example, the service announcement information may be indicated by a new special message identifier, and with a special data coding scheme. The PWS message content may carry the encoded TMGI (or eMBMS Service ID), and in some cases, other session information for the emergency broadcast program. From the UE perspective, the UE may parse the service announcement information and retrieve the emergency broadcast program accordingly. For example, the UE may alert the user of the emergent situation as carried in or indicated by the PWS message. The UE may also prompt the user to the availability of additional information over eMBMS/EnTV. For instance, the UE may display to the user "Tsunami Alert! Additional information available on EnTV, Click Yes to watch?" Upon user confirmation (for example, by clicking "Yes"), the UE may automatically (for example, without any further user input) start receiving the emergency broadcast program over eMBMS/EnTV.

In some aspects of the present disclosure, the BS may include an indicator in the PWS message and a SIB or radio resource control (RRC) signaling may be defined to assist the UE in automatically (for example, without user input) discovering and receiving the corresponding emergency broadcast program(s) over eMBMS/EnTV. For example, the BS may include the indicator as part of an IE in the PWS message. The indicator may be a new IE, a special message identifier, or a special Unicode Symbol in the PWS message, as described herein. In some aspects, the BS may generate and transmit to the UE a SIB or RRC signaling to carry the service announcement information for emergency broadcast Program. For example, the PWS message in a SIB may indicate that RRC signaling will include the service announcement information or the radio resource carrying the service announcement information to be retrieved by the UE.

A BS may transmit data on a physical downlink shared channel (PDSCH) for service announcement information or in some cases the multimedia emergency service itself. The BS may transmit the PWS message using SIB 8, and in some cases a PDCCH, for the scheduling of the PDSCH. As one example, SIB 8 may be used to indicate a resource number for the PDSCH. As another example, SIB 8 may have a bit to indicate that there is a multimedia message to be received (for example, via the PDSCH).

In other words, the BS may include an extension in the PWS message (for example, the SIB8 in 5G) to indicate the scheduled transmission on the PDSCH. The UE may then receive the PDSCH and obtain the service announcement relevant information for the accompanying emergency broadcast program over eMBMS/EnTV. The PDSCH may be a unicast physical channel including information for the retrieval of the emergency broadcast program for eMBMS broadcast transportation (for example, via a physical multicast channel (PMCH)). In some aspects, a BS may include a new indicator in the PWS message (for example, the SIB8 in 5G) and transmit RRC signaling to indicate the scheduled transmission on the PDSCH.

Figure 7A:
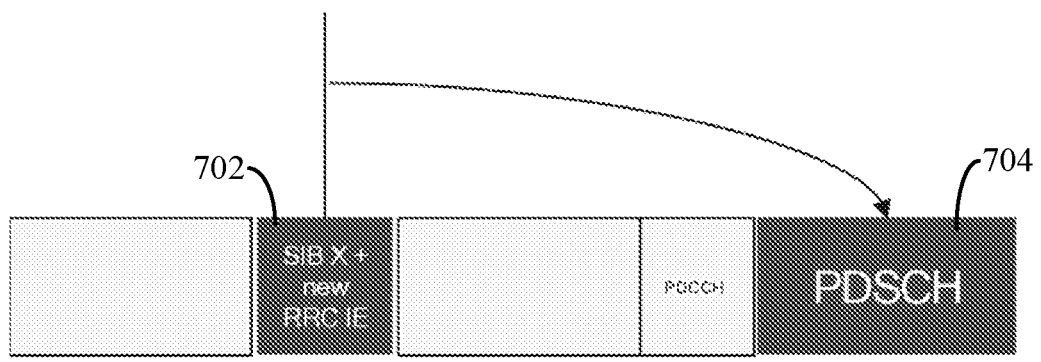
FIGS. 7A and 7B illustrate example signaling protocols for communicating service announcement information, in accordance with some aspects of the present disclosure.
Figure 7B:
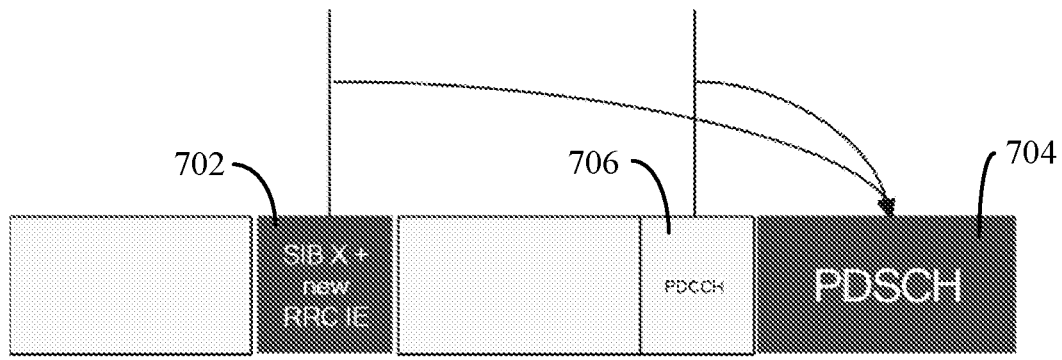

FIGS. 7A and 7B illustrate example signaling protocols for communicating service announcement information, in accordance with some aspects of the present disclosure. As illustrated in FIG. 7A, an extension in the PWS message (for example, in a SIB) and the RRC signaling 702 may schedule the transmission slot on PDSCH 704. In other aspects, as illustrated in FIG. 7B, the extension in the PWS message and the RRC signaling 702 may only indicate partial transmission schedule information for the PDSCH 704. The UE may then receive downlink control information (DCI) 706 on a control channel (for example, on a PDCCH) to determine the exact transmission slot for reception of the service announcement information in the PDSCH 704.

In some aspects, a UE may detect an indicator in the PWS message, and then receive service announcement information via an SIB, RRC signaling, a PDSCH, or any combination thereof. The UE may then, upon user confirmation, automatically start receiving the emergency broadcast program in accordance with the service announcement information.

As described above, particular aspects of the present disclosure provide techniques for association of a PWS warning message over CBS with an emergency broadcast program over eMBMS/EnTV. For example, the methods and systems described herein provide an explicit or implicit indictor in the PWS message to indicate the existence of an accompanying emergency broadcast program over eMBMS/EnTV and to notify the user that additional information can be obtained from eMBMS/EnTV. Some aspects also provide techniques for conveying partial or complete service announcement information associated with the emergency broadcast program over eMBMS/EnTV in a PWS message, and for assisting a UE or user in discovering and accessing the corresponding emergency broadcast program over eMBMS/EnTV.

Figure 8:
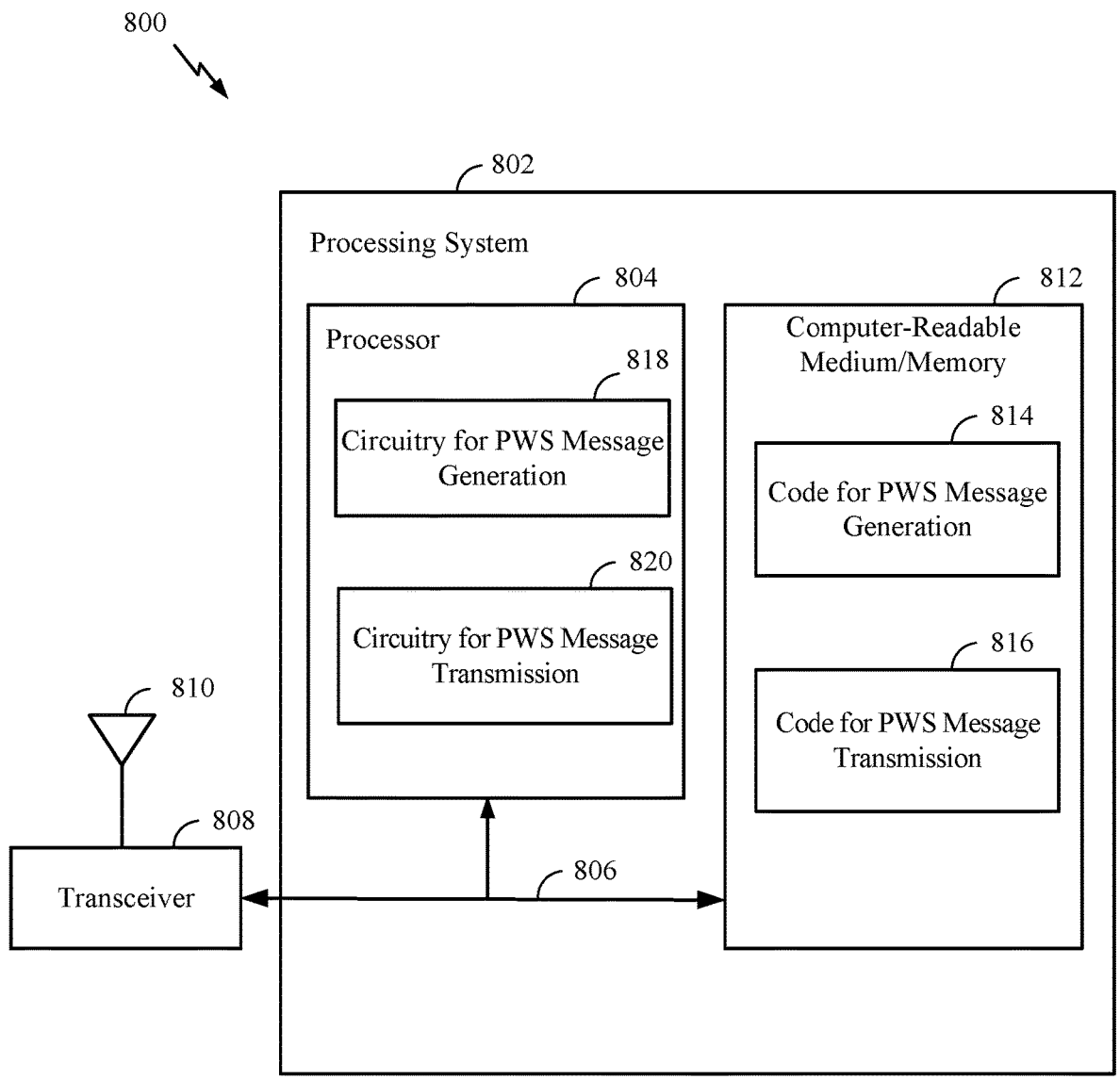
FIG. 8 illustrates a communications device that may include various components configured to perform operations for the techniques disclosed herein.

FIG. 8 illustrates a communications device 800 that may include various components (e.g., corresponding to means-plus-function components) configured to perform operations for the techniques disclosed herein, such as the operations illustrated in FIG. 4. The communications device 800 includes a processing system 802 coupled to a transceiver 808 (e.g., a transmitter and/or a receiver). The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 4, or other operations for performing the various techniques discussed herein. In certain aspects, computer-readable medium/memory 812 stores code 814 for PWS message generation; code 816 for PWS message transmission. In certain aspects, the processor 804 has circuitry configured to implement the code stored in the computer-readable medium/memory 812. The processor 804 includes circuitry 818 for PWS message generation; and circuitry 820 for PWS message transmission.

Figure 9:
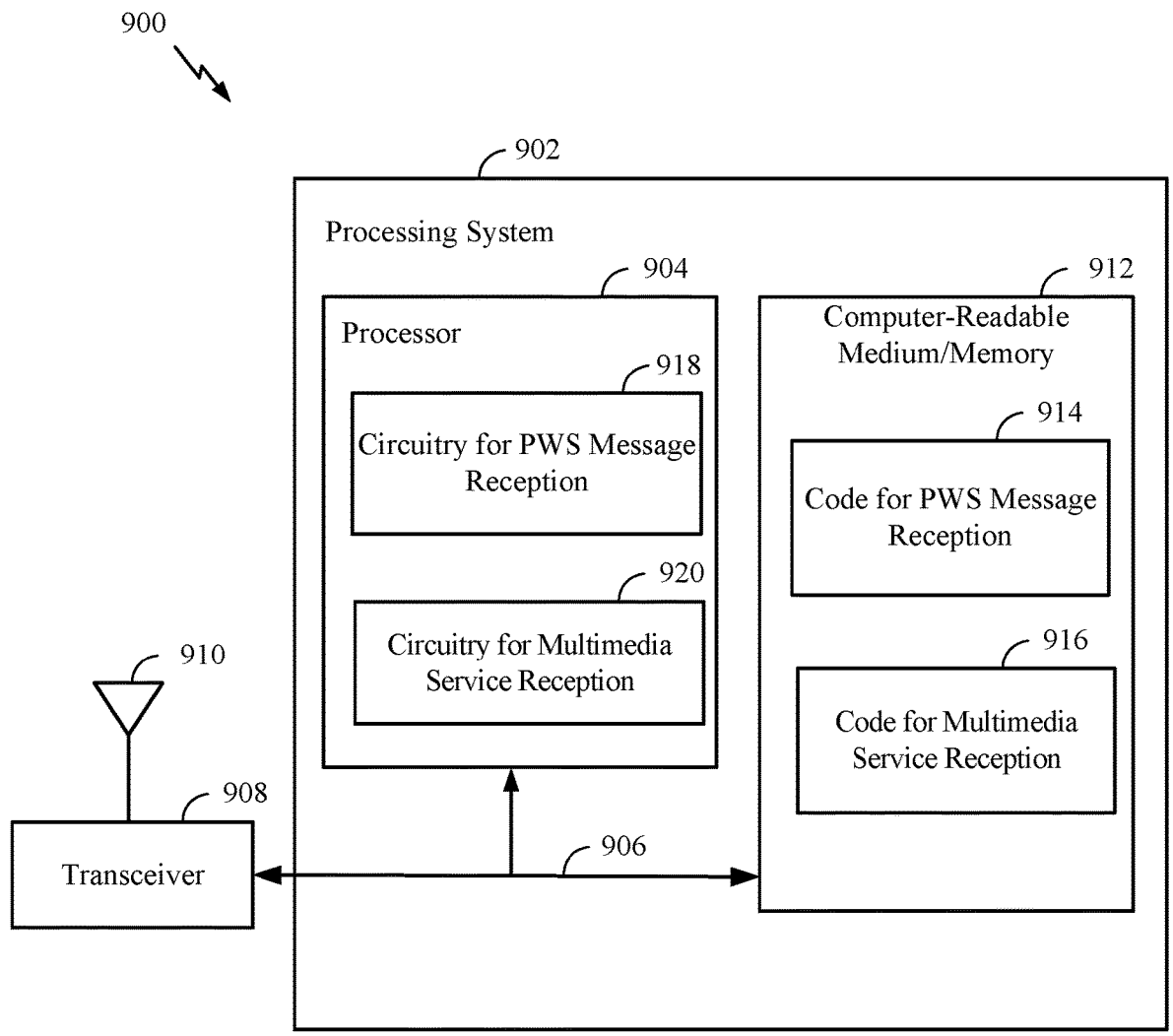
FIG. 9 illustrates a communications device that may include various components configured to perform operations for the techniques disclosed herein.

FIG. 9 illustrates a communications device 900 that may include various components (e.g., corresponding to means-plus-function components) configured to perform operations for the techniques disclosed herein, such as the operations illustrated in FIG. 5. The communications device 900 includes a processing system 902 coupled to a transceiver 908 (e.g., a transmitter and/or a receiver). The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 5, or other operations for performing the various techniques discussed herein. In certain aspects, computer-readable medium/memory 912 stores code 914 for PWS message reception; and code 916 for multimedia service reception. In certain aspects, the processor 904 has circuitry configured to implement the code stored in the computer-readable medium/memory 912. The processor 904 includes circuitry 918 for PWS message reception; and circuitry 920 for multimedia service reception.

As used herein, the term "determining" may encompass one or more of a wide variety of actions. For example, "determining" may include calculating, computing, processing, deriving, investigating, looking up (for example, looking up in a table, a database or another data structure), assuming and the like. Also, "determining" may include receiving (for example, receiving information), accessing (for example, accessing data in a memory) and the like. Also, "determining" may include resolving, selecting, choosing, establishing and the like.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. A user-equipment (UE) configured for wireless communications, the UE comprising:
　a memory comprising computer-executable instructions; and
　a processor configured to execute the computer-executable instructions and cause the UE to:
　　receive a public warning system (PWS) message from an access and mobility function (AMF) via a next generation Node B (gNB), wherein the PWS message includes information associated with at least one program provided via a multimedia service; and retrieve the at least one program via the multimedia service based on the information indicated in the PWS message.

2. The UE of claim 1, wherein the multimedia service comprises an enhanced television (enTV) service.

3. The UE of claim 1, wherein the processor is configured to execute the computer-executable instructions and further cause the UE to:

receive input from a user of the UE to retrieve the at least one program; and retrieve the at least one program based on the input.

4. The UE of claim 3, wherein the processor is configured to execute the computer-executable instructions and further cause the UE to retrieve the at least one program by launching an application client for the multimedia service in response to the input from the user.

5. The UE of claim 1, wherein the information, in the PWS message, associated with the at least one program comprises a Uniform Resource Locator (URL) associated with the at least one program.

6. The UE of claim 1, wherein the information, in the PWS message, associated with the at least one program comprises:

an indicator, in one or more information elements (IEs) of the PWS message, signaling to the UE an existence of the at least one program; or a configured message identifier that indicates the existence of the at least one program.

7. The UE of claim 1, wherein the information comprises service announcement information for the UE to discover and retrieve the at least one program via the multimedia service.

8. The UE of claim 7, wherein the PWS message is received as part of a system information block (SIB) having one or more information elements (IEs) indicating the service announcement information.

9. The UE of claim 7, wherein the service announcement information comprises Temporary Mobile Group Identity (TMGI) identifying resources for the retrieval of the at least one program.

10. The UE of claim 7, wherein the service announcement information comprises a service identifier indicating the at least one program, and the processor is configured to execute the computer-executable instructions and further cause the UE to retrieve the at least one program based on the service identifier.

11. The UE of claim 7, wherein the PWS message comprises a configured message identifier indicating the service announcement information.

12. The UE of claim 11, wherein the service announcement information uses a configured coding scheme and comprises a Temporary Mobile Group Identity (TMGI) identifying resources for the retrieval of the at least one program.

13. The UE of claim 11, wherein the service announcement information uses a configured coding scheme and comprises a service identifier indicating the at least one program, and the processor is configured to execute the computer-executable instructions and further cause the UE to retrieve the at least one program based on the service identifier.

14. The UE of claim 7, wherein the processor is configured to execute the computer-executable instructions and further cause the UE to:

alert a user of availability of the at least one program based on the service announcement information;

receive input from the user to retrieve the at least one program; and retrieve the at least one program in response to the input from the user.

15. The UE of claim 1, wherein the PWS message indicates that service announcement information is to be received via another message, and wherein the processor is configured to execute the computer-executable instructions and further cause the UE to:

receive the other message having the service announcement information; and H, retrieve the at least one program based on the service announcement information in the other message.

16. The UE of claim 15, wherein the other message having the service announcement information comprises a system information block, radio resource control (RRC) message, or physical downlink shared channel (PDSCH).

17. The UE of claim 15, wherein the other message having the service announcement information comprises a physical downlink shared channel (PDSCH) and wherein the processor is configured to execute the computer-executable instructions and further cause the UE to receive downlink control information (DCI) indicating resources allocated for the reception of the PDSCH.

18. A next generation Node B (gNB) configured for wireless communications, the gNB comprising:

a memory comprising computer-executable instructions; and a processor configured to execute the computer-executable instructions and cause the gNB to:

receive a public warning system (PWS) message from an access and mobility function (AMF), wherein the PWS message includes information associated with at least one program provided via a multimedia service; and transmit the PWS message to a user-equipment (UE).

19. The gNB of claim 18, wherein the multimedia service comprises an enhanced television (enTV) service.

20. The gNB of claim 18, wherein the information, in the PWS message, associated with the at least one program comprises a Uniform Resource Locator (URL) associated with the at least one program.

21. The gNB of claim 20, wherein the information, in the PWS message, associated with the at least one program comprises:

an indicator, in one or more information elements (IEs) of the PWS message, signaling to the UE an existence of the at least one program; or a configured message identifier that indicates the existence of the at least one program.

22. The gNB of claim 18, wherein the information comprises service announcement information for the UE to discover and retrieve the at least one program via the multimedia service.

23. The gNB of claim 22, wherein the processor is configured to execute the computer-executable instructions and further cause the gNB to deliver the PWS message as part of a system information block (SIB) having one or more IEs indicating the service announcement information.

24. The gNB of claim 23, wherein the service announcement information comprises a service identifier indicating the at least one program.

25. The gNB of claim 22, wherein the PWS message comprises a configured message identifier indicating the service announcement information.

26. The gNB of claim 18, wherein the PWS message indicates that service announcement information is to be received via another message, and wherein the processor is configured to execute the computer-executable instructions and further cause the gNB to transmit the other message having the service announcement information.

27. The gNB of claim 26, wherein the other message having the service announcement information comprises a system information block, radio resource control (RRC) message, or physical downlink shared channel (PDSCH).

28. The gNB of claim 26, wherein the other message having the service announcement information comprises a physical downlink shared channel (PDSCH), and wherein the processor is further configured to transmit downlink control information (DCI) indicating resources allocated for reception of the PDSCH.

29. A method for wireless communication by a user-equipment (UE), the method comprising:
receiving a public warning system (PWS) message from an access and mobility function (AMF) via a next generation Node B (gNB), wherein the PWS message includes information associated with at least one program provided via a multimedia service; and
retrieving the at least one program via the multimedia service based on the information indicated in the PWS message.

30. The method of claim 29, wherein the multimedia service comprises an enhanced television (enTV) service.

31. The method of claim 29, further comprising receiving input from a user of the UE to retrieve the at least one program, wherein the retrieving is based on the input.

32. A method for wireless communication, the method comprising:
receiving, at a next generation Node B (gNB) from an access and mobility function (AMF) a public warning system (PWS) message, wherein the PWS message includes information associated with at least one program provided via a multimedia service; and
transmitting the PWS message to a user-equipment (UE).

33. The method of claim 32, wherein the multimedia service comprises an enhanced television (enTV) service.

34. The method of claim 32, wherein the information comprises a Uniform Resource Locator (URL) associated with the at least one program.

* * * * *